US006865580B1

(12) United States Patent
Bush

(10) Patent No.: US 6,865,580 B1
(45) Date of Patent: Mar. 8, 2005

(54) DYNAMIC MULTI-OBJECT COLLECTION AND COMPARISON AND ACTION

(75) Inventor: Eric N. Bush, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 651 days.

(21) Appl. No.: 09/851,238

(22) Filed: May 8, 2001

Related U.S. Application Data

(63) Continuation-in-part of application No. 09/513,812, filed on Feb. 25, 2000, now Pat. No. 6,754,664.
(60) Provisional application No. 60/142,209, filed on Jul. 2, 1999.

(51) Int. Cl.[7] .............................................. G06F 17/00
(52) U.S. Cl. .................... 707/103 Y; 717/127; 709/224
(58) Field of Search .............................. 707/103 Y, 103; 709/224–226; 717/127, 9; 455/91; 340/540; 711/11; 714/38

(56) References Cited

U.S. PATENT DOCUMENTS

| | | | | | |
|---|---|---|---|---|---|
| 5,488,723 | A | * | 1/1996 | Baradel et al. | 719/315 |
| 5,726,987 | A | * | 3/1998 | Uriu et al. | 370/395.72 |
| 6,055,418 | A | * | 4/2000 | Harris et al. | 455/91 |
| 6,126,330 | A | * | 10/2000 | Knight | 717/127 |
| 6,198,390 | B1 | * | 3/2001 | Schlager et al. | 340/540 |
| 6,216,237 | B1 | * | 4/2001 | Klemm et al. | 714/38 |
| 6,295,643 | B1 | * | 9/2001 | Brown et al. | 717/148 |
| 6,324,619 | B1 | * | 11/2001 | Raverdy et al. | 717/120 |
| 6,466,980 | B1 | * | 10/2002 | Lumelsky et al. | 709/226 |
| 6,473,791 | B1 | * | 10/2002 | Al-Ghosein et al. | 709/217 |
| 6,631,409 | B1 | * | 10/2003 | Watson et al. | 709/224 |

OTHER PUBLICATIONS

Maston, Michael, "Managing Windows with WMI," Microsoft Corporation, http://msdn.microsoft.com/library/techart/mngwmi.htm, Nov. 1999, pp. 1–14.

Snodgrass, Richard, "A Relational Approach to Monitoring Complex Systems," ACM Transactions on Computer Systems, vol. 6, No. 2, May 1988, pp. 157–196.

Joyce et al., "Monitoring Distributed Systems," ACM Transactions on Computer Systems, vol. 5, No. 2, May 1987, pp. 121–150.

(List continued on next page.)

*Primary Examiner*—Greta Robinson
*Assistant Examiner*—Sathyanarayan Pannala
(74) *Attorney, Agent, or Firm*—Senniger Powers

(57) ABSTRACT

A system and method for monitoring one or more objects of a class where the class has one or more attributes and each object has an attribute value associated with each attribute. During a user-specified interval, a monitoring application dynamically identifies the objects, examines the attribute values of each identified object, and performs one or more functions in response to the examined values. The user requests the objects to be monitored by specifying the class of the objects. In this manner, the monitoring application monitors software applications that dynamically create objects, where the objects are not individually identified to the monitoring application. The monitoring application compares each of the attribute values of each object against a threshold value associated with that attribute in the class. Based on the result of each comparison, the monitoring application may perform one or more functions as appropriate. The monitoring application maintains a list of the identified objects and attribute values across multiple identification intervals for comparison.

20 Claims, 7 Drawing Sheets

OTHER PUBLICATIONS

Hollingsworth et al., "Dynamic Control of Performance Monitoring on Large Scale Parallel Systems," Proceedings of the 1993 International Conference on Supercomputing, 1993, pp. 185–194.

Agrawal et al., "OdeView: The Graphical Interface to Ode," Proceedings of the 1990 ACM SIGMOD International Conference on Management of Data, 1990, pp. 34–43.

Shende et al., "Portable Profiling and Tracing for Parallel, Scientific Applications Using C++," Proceedings of the SIGMETRICS Symposium on Parallel and Distributed Tools, 1998, pp. 134–145.

Bruegge et al., "A Framework for Dynamic Program Analyzers," Proceedings of the Eighth Annual Conference on Object–oriented Programming Systems, Languages, and Applications, 1993, pp. 65–82.

* cited by examiner

DYNAMIC MULTI-OBJECT COLLECTION AND COMPARISON AND ACTION

CROSS-REFERENCE TO RELATED APPLICATIONS

This is a continuation-in-part of U.S. patent application Ser. No. 09/513,812, filed Feb. 25, 2000 now U.S. Pat. No. 6,754,664, which is based on U.S. provisional patent application Ser. No. 60/142,209, filed Jul. 2, 1999, now abandoned, which are both incorporated by reference herein for all purposes.

TECHNICAL FIELD

The present invention relates to the fields of data monitoring and object-oriented programming. In particular, this invention relates to the dynamic collection of objects from a class, comparison of attribute values of the objects with threshold values common to the attributes in the class, and action based on the result of the comparison.

BACKGROUND OF THE INVENTION

In object-oriented programming, a class is a category that describes a group of more specific items, called objects, that can exist within the class. The class is a descriptive tool used in a software application to define a set of attributes, services, or other properties that characterize any object of the class. Each object is an instance of the class. Each object has an attribute value associated with each attribute defined by the class.

In object-oriented databases, one or more of the attributes defined by the class can be designated as a key attribute. Each object of the class has a unique attribute value associated with the key attribute. By specifying a value for the key attribute, a user can direct a software application to retrieve a specific object. A monitoring application can examine and verify attribute values of objects. In particular, the monitoring application compares the attribute values of the given object to threshold values to determine if any action should be taken. In this and similar monitoring applications, however, the objects to be examined must be statically identified to the application prior to the comparison. In addition, the threshold values and actions must be defined for each object statically identified.

The invention described below addresses these and other disadvantages.

SUMMARY OF THE INVENTION

The invention dynamically identifies one or more objects, examines the attribute values of each identified object, and performs one or more functions in response to the examined values. The user requests the objects to be monitored by specifying the class of the objects. In this manner, the monitoring application monitors other software applications that dynamically create objects, where the key attribute values of the objects are not known to the monitoring application in advance of their creation. The invention includes a software monitoring application that monitors a database during a user-specified interval to identify and collect all objects of the specified class. A threshold value may be associated with each attribute in the class. The monitoring application compares each of the attribute values of each object against the threshold value associated with that attribute in the class. Based on the result of each comparison, the monitoring application may perform one or more functions as appropriate. The result of a comparison may also indicate that no function should be performed. The monitoring application maintains a list of the identified objects across multiple identification intervals. Objects are added to and/or deleted from the list as appropriate. For example, a particular dynamic object may persist across only one or two identification intervals. In this manner, the monitoring application considers whether previous action was undertaken in response to a threshold comparison during a previous interval for a specific object.

The invention permits the user to monitor all objects of a given class by identifying only the class. The invention also permits the user to specify a threshold value for each attribute in the class to be compared with the corresponding attribute values in all objects of the given class. The invention facilitates association of one or more functions with each attribute in the class, where the functions are selectively performed in response to the threshold comparison. The invention also permits the user to direct the monitoring of a large number of dynamic objects by specifying a monitoring interval and a maximum number of objects to collect during the monitoring interval.

In accordance with one aspect of the invention, a computer-implemented method monitors one or more objects of a specified class. The class has one or more attributes. Each object has an attribute value associated with each attribute. The method dynamically identifies the objects of the specified class. The method also compares at least one of the attribute values of each identified object with a threshold value associated with at least one of the attributes in the class and maintains a list of the identified objects and the attribute values of the identified objects over time. The method further identifies changes in the attribute values of each identified object over time and performs one or more functions in response to comparing and identifying changes.

In accordance with another aspect of the invention, a computer-readable medium has computer-executable components for monitoring one or more objects of a specified class. The class has one or more attributes. Each object has an attribute value associated with each attribute. The computer-readable medium also includes an object identification component for dynamically identifying the objects of the specified class. The computer-readable medium also includes a comparison component for comparing at least one of the attribute values of each identified object with a threshold value associated with at least one of the attributes in the class. The computer-readable medium also includes a history component for identifying changes in the attribute values of each identified object over time. The computer-readable medium also includes a performance component responsive to the comparison component and the history component for performing one or more functions.

In accordance with another aspect of the invention, a system monitors one or more objects of a class. The class has one or more attributes. Each object has an attribute value associated with each attribute. The system includes means for dynamically identifying the objects of the class, means for comparing at least one of the attribute values of each identified object with a threshold value associated with at least one of the attributes in the class, means for maintaining a list of the identified objects and the attribute values of the identified objects over time, means for identifying changes in the maintained attribute values of each identified object over time, and means for performing one or more functions in response to the means for comparing and the means for identifying changes.

Alternatively, the invention may comprise various other methods and apparatuses.

BRIEF DESCRIPTION OF THE DRAWINGS

Corresponding reference characters indicate corresponding parts throughout the drawings.

DETAILED DESCRIPTION OF THE INVENTION

Figure 1:
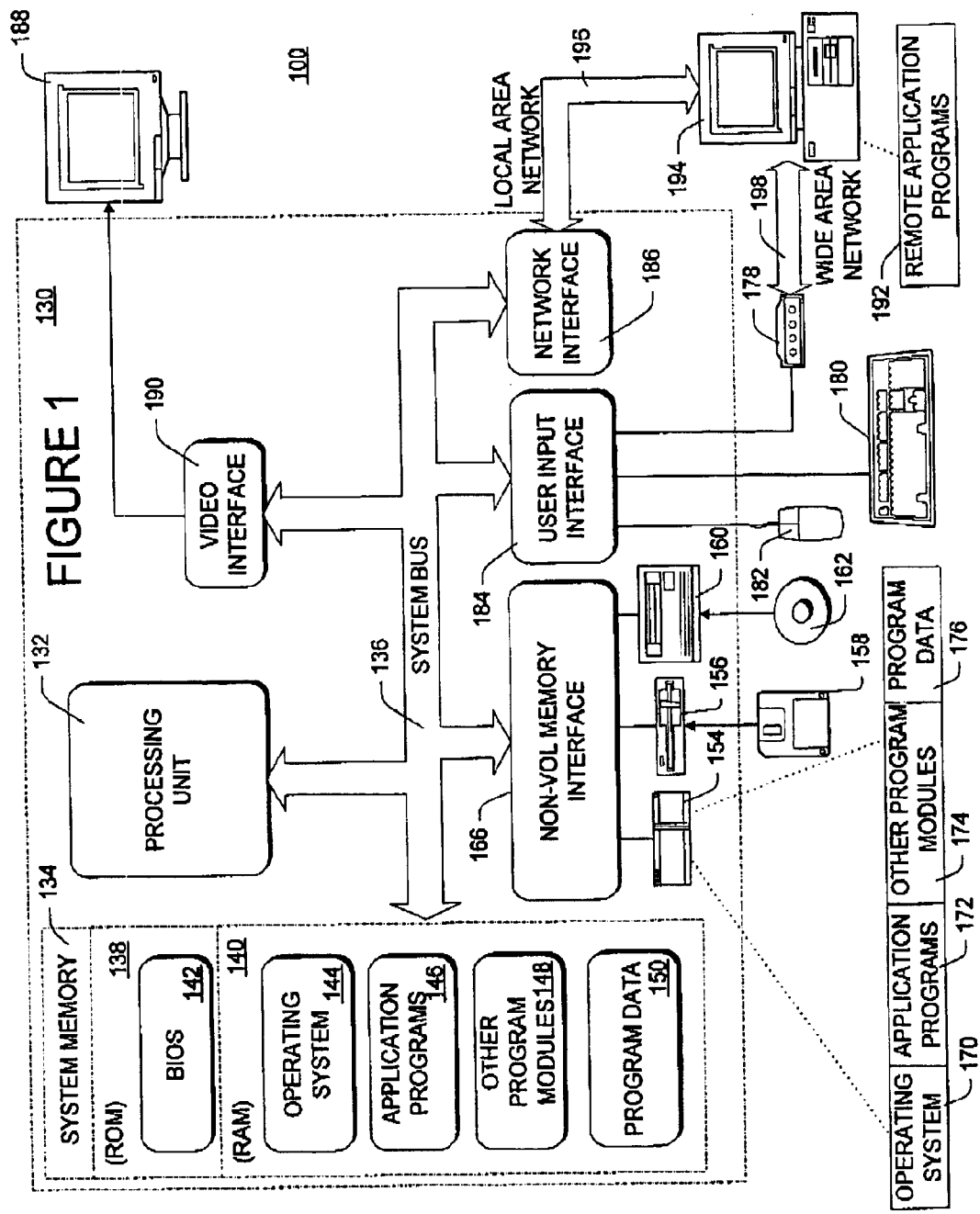
FIG. 1 is a block diagram of one embodiment of the method and system of the invention illustrating one example of a suitable computing system environment on which the invention may be implemented.

In general, the invention relates to a method and system for monitoring one or more objects of a class. In object-oriented programming, a class is a category that describes a group of more specific items, called objects, that can exist within the class. The class is a descriptive tool used in a software application to define a set of attributes, services, or other properties that characterize any object of the class. Each class has one or more attributes. Each object is an instance of the class and has an attribute value associated with each attribute defined by the class.

The objects are stored in a database maintained by a software application implementing the Web-Base Enterprise Management (WBEM) protocol such as Windows® Management Instrumentation (WMI), which is a component of the Microsoft® Windows® operating system by Microsoft Corporation. The WBEM software application is a management mechanism that provides uniform data collection into the database and the data management database to manage and monitor local and remote computer systems. The WBEM software application stores in the database the objects representing collected statistics relating to the monitored computers. The database includes statistics relating to a single computer or multiple computers. The statistics within the database relate to the physical disks on the monitored computer, software applications executing on the computer, or any other performance or event-based information. Another software application (e.g., a monitoring application) interfaces with the database to collect and analyze information for a user. During a user-defined interval, the monitoring application interfaces with the database to dynamically identify one or more objects, examine the attribute values of each identified object, and perform one or more functions in response to the examine values. The monitoring application maintains a list of the identified objects across multiple intervals. Objects are added to and/or deleted from the list as appropriate. For example, a particular dynamic object may persist across only one or tow identification intervals. In this manner, the monitoring application considers whether previous acting was undertaken in response to a threshold comparison during a previous interval for a specific object. In one embodiment, the monitoring application is an in-process dynamic-link library to WMI.

The invention allows the user to specify individual objects or classes of objects to monitor. If the user specifies the class, the monitoring application dynamically identifies objects of the class without requiring the objects to be specifically identified by the user. In this manner, the monitoring application is able to identify objects that cannot easily be specified by the user. In one embodiment, the amount of objects identified is limited by the monitoring application since there may be many objects associated with a single specified class. For example, the number of identified objects may be limited to one hundred.

For general information regarding WMI, refer to Solomon and Russinovich, Inside Microsoft Windows 2000, 3rd Edition, 2000, pages 265–275, herein incorporated by reference.

Referring first to FIG. 1, a block diagram illustrates one example of a suitable computing system environment 100 on which the invention may be implemented. The computing system environment 100 is only one example of a suitable computing or operating environment and is not intended to suggest any imitation as to the scope of use or functionality of the invention. Neither should the computing system environment 100 be interpreted as having any dependency or requirement relating to any one or combination of components illustrated in the exemplary computing system environment 100.

FIG. 1 shows one example of a general purpose computing device in the form of a computer 130. In a preferred embodiment of the invention, a computer such as the computer 130 is suitable for use in FIGS. 2, 3, and 7.

Computer 130 preferably has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (NCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data.

For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 preferably includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 1 illustrates operating system 144, application programs 146, other program modules 148, and program data 150.

The computer 130 may also include other removable/non-removable, volatile/nonvolatile computer storage media. For example, FIG. 1 illustrates a hard disk drive 154 that reads from or writes to non-removable, nonvolatile magnetic media.

FIG. 1 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 144, and magnetic disk drive 156 and optical disk drive 160 are typically connected to the system bus 136 by a nonvolatile memory interface, such as interface 166.

The drives or other mass storage devices and their associated computer storage media discussed above and illustrated in FIG. 1, provide storage of computer readable instructions, data structures, program modules and other data for the computer 130. In FIG. 1, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a universal serial bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 1 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 194, or other appropriate mechanism. In a networked environment, program modules depicted relative to computer 130, or portions thereof, may be stored in a remote memory storage device (not shown). By way of example, and not limitation, FIG. 1 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Figure 2:
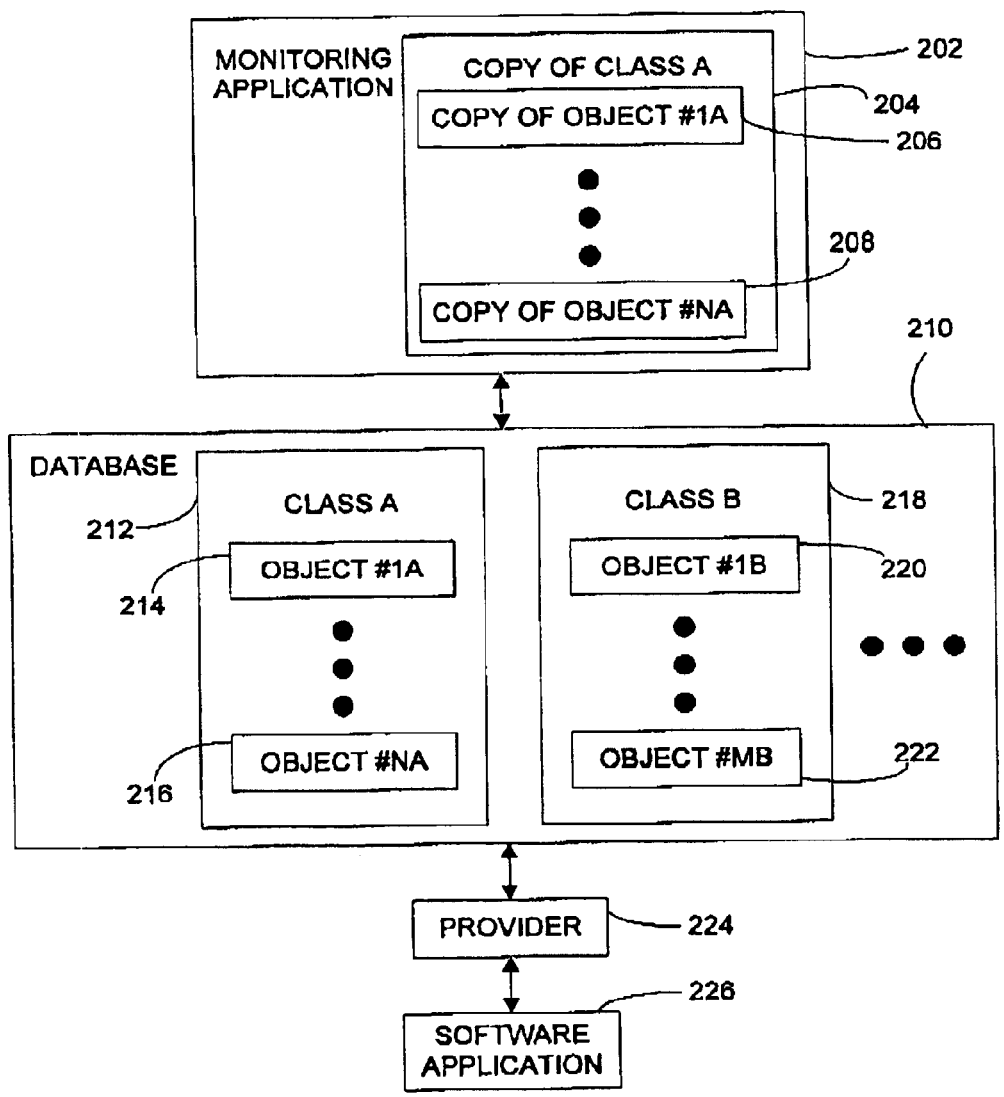
FIG. 2 is a block diagram of one embodiment of the method and system of the invention illustrating communication between a monitoring application and a software application from which performance data is collected.

Referring next to FIG. 2, a block diagram illustrates communication between the monitoring application and a software application from which performance data is collected. The monitoring application 202 communicates with the database 210. The database 210 communicates with a provider 224, where the provider 224 communicates with the software application 226 to be monitored. In one embodiment, multiple software applications 226 execute on the computer, and separate providers 224, each specific to a particular software application 226, are included to communicate statistics to the database 210 (not shown). Since each software application 226 may store information in a different format, each provider 224 interfaces with each software application 226 to obtain performance or event-based statistics relating to the software application 226. For example, the performance statistics may include response times or the amount of processor time utilized. Similarly, the event-based statistics may include errors and diagnostic messages. The provider 224 transmits the statistics to the database 210 where the statistics are stored in a common format. In one embodiment, the database 210 stores the statistics in an object-oriented format using classes and objects. In this manner, the database 210 organizes and stores statistics specific to the monitored computer, including statistics relating to the multiple software applications 226 executing on the monitored computer. For example, the database 210 has multiple classes including Class A 212 and Class B 218. Each class may have multiple objects. Object #1A 214 through Object #NA 216 are instances of Class A 212. Object #1B 220 through Object #MB 222 are instances of Class B 218. In this example, there are N instances of Class A 212 and M instances of Class B 218 stored in the database 210. The monitoring application 202 communicates with the database 210 to retrieve selected objects of selected classes. In FIG. 2, the monitoring application 202 has obtained a copy of Class A 204 from the database 210, where the copy of Class A 204 includes a copy of Object #1A 206 through a copy of Object #NA 208. The monitoring application 202 communicates with the database 210 at regular intervals as specified by the user. In one embodiment, the objects are dynamically identified in response to a user request. In another embodiment, the objects are dynamically identified in response to an update to the database 210 by the provider 224.

An exemplary class structure for identifying objects to be monitored includes the following. Class A 212 may represent logical disks. Each object of Class A 212 represents a distinct logical disk. Further, Class B 218 may represent processes. Each object of Class B 218 represents a distinct process. In this manner, each class represents processes, threads, mass storage devices, or any other statistic to be monitored. In one embodiment, when the class represents a mass storage device, the attributes include a free space attribute, a capacity attribute, and a description attribute. The attribute values of an exemplary object from this class may include an attribute value of ten megabytes for the free space attribute, an attribute value of ten gigabytes for the capacity attribute, and an attribute value of "C" for the description attribute.

A class structure also exists to define the class of objects to be collected and the collection interval. A collector class includes, but is not limited to, attributes representing the collection interval, a namespace, and an object path. The namespace describes a database that includes a collection of class definitions and object instances. Multiple namespaces can exist on any given computer. A value associated with the namespace attribute specifies a path to a particular database. For example, the collection interval may be every sixty seconds, the namespace may be root\\cimv2\monitor, and the object path may contain LogicalDisk. In this example, the monitoring application 202 collects data on each object (i.e., hard disk) of the LogicalDisk class associated with the monitored computer every sixty seconds. The data includes the attribute values of each object (e.g., the amount of remaining disk capacity or a description of the disk).

Figure 3:
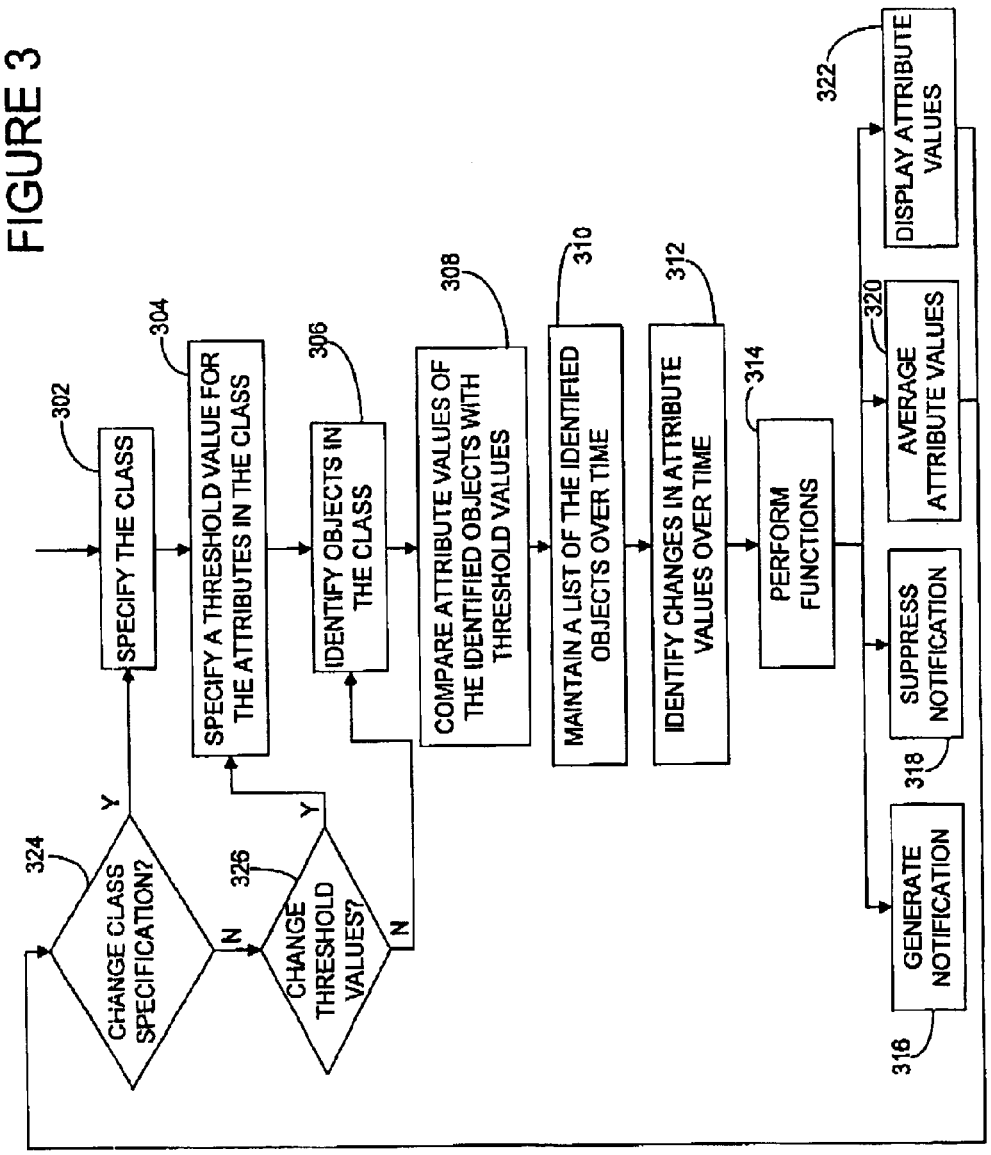
FIG. 3 is a flow chart of one embodiment of the method and system of the invention illustrating object identification and attribute value comparison.

Referring next to FIG. 3, a block diagram illustrates object identification and attribute value comparison of the method and system according to the invention. The user specifies at 302 the class and specifies at 304 a threshold value for each attribute in the class. In one embodiment, the threshold value is associated with at least one attribute. The monitoring application (e.g., monitoring application 202 of FIG. 2) dynamically identifies at 306 the objects in the specified class. The monitoring application compares at 308 at least one of the attribute values of each identified object with a threshold value associated with the appropriate attribute. The monitoring application maintains at 310 a list of the identified objects and the attribute values of the identified objects over time and identifies at 312 changes in the attribute values of each identified object over time. In response to the comparisons between the attribute values and the threshold values, the monitoring application performs at 314 one or more functions in response to comparing and identifying changes. The functions include generating at 316 a notification to the user, suppressing at 318 a notification if the attribute value of the specific object exceeded the threshold value in the previous interval, averaging at 320 attribute values over the intervals as an indication of performance, and/or displaying at 322 the attribute values to the user. The user is given the option to change or otherwise update at 324 the specified classes and/or change or otherwise update at 326 the threshold values.

There are several alternative embodiments of FIG. 3. Function performance includes generating a notification if an attribute value of a specific object exceeds the threshold value or otherwise violates a condition. For example, function performance may include notifying a user of a free space attribute value and a description attribute value of a specific object if the free space attribute value of the specific object exceeds the threshold value associated with the free space attribute of the specific object. The monitoring application maintains the list of the objects over time by adding at least one of the identified objects to the list, deleting at least one of the identified objects from the list, and/or preserving the list during a given interval. The threshold value is associated with one or more of the attributes of the class separately or in combination. For example, the threshold value may be associated with a ratio of two attributes. Maintaining the list of identified objects may occur after the threshold comparison. The monitoring application dynamically collects the objects in at least four ways: by requesting all objects from the database of a specific class, by executing a routine (e.g., method) within the database which returns the desired objects to the monitoring application, by executing a query which returns the desired objects to the monitoring application, and by registering a query to receive all objects returned by the query during a specified interval. The threshold comparison includes comparing each of the attribute values or an average of each attribute value of each collected object against the appropriate threshold value. The threshold comparison also includes comparing a response time or an average response time associated with the attribute values of each collected object. The threshold comparison also includes testing against the number of objects collected during the interval. The threshold comparison also includes comparing any of the values described herein from one interval to the next.

In another embodiment, the monitoring application identifies the objects during an interval in at least two ways: polling-based and event-based. During polling-based object collection, the monitoring application regularly examines the classes specified by the user to determine whether objects need to be collected for each class since each class may require object collection at different times. The monitoring application regularly examines the classes, for example, every ten seconds or as specified by the user. If one of the monitored classes requires object collection, the monitoring application collects the objects as described herein and executes the threshold comparisons. During event-based object collection, the objects are continuously collected and stored in the database. Information about new and current objects is stored while information about expired objects is discarded. When the collection interval for a specific class elapses, the monitoring application executes the threshold comparisons for the current, collected objects and associated attribute values.

A graphical user interface or a textual user interface constitute means for specifying the class. A software application implemented in C++(see Appendix A) constitutes means for dynamically identifying the objects of the class, means for comparing at least one of the attribute values of each identified object with a threshold value associated with at least one of the attributes in the class, and means for identifying changes in the maintained attribute values of each identified object over time. An array constitutes means for maintaining a list of the identified objects and the attribute values of the identified objects over time. For event-based object collection, objects in the array are marked "not needed" at the beginning of each collection interval. New objects are added to the end of the array as they are collected during the collection interval. Current objects within the array are marked "needed" as they are collected. At the end of the collection interval, objects marked "not needed" are discarded. The software application implemented in C++ also constitutes means for performing one or more functions in response to the means for comparing and the means for identifying changes. Further, the examples described above and examples described elsewhere herein constitute means for specifying the class, means for dynamically identifying the objects of the class, means for comparing at least one of the attribute values of each identified object with a threshold value associated with at least one of the attributes in the class, means for maintaining a list of the identified objects and the attribute values of the identified objects over time, means for identifying changes in the maintained attribute values of each identified object over time, and means for performing one or more functions in response to the means for comparing and the means for identifying changes.

In the example where the monitoring application collects data on each object (i.e., hard disk) of the LogicalDisk class associated with the monitored computer every sixty seconds, the monitoring application compares the collected data (e.g., the amount of remaining disk capacity) against the threshold value for that attribute. In this example, the threshold value may be 5% capacity available. If the amount of remaining disk capacity is less than the threshold value, an electronic mail (email) message is sent to the system administrator including a description of the object that violated the threshold and a description of the violation. For example, the email message may read "Drive C: is: below 5%."

Figure 4:
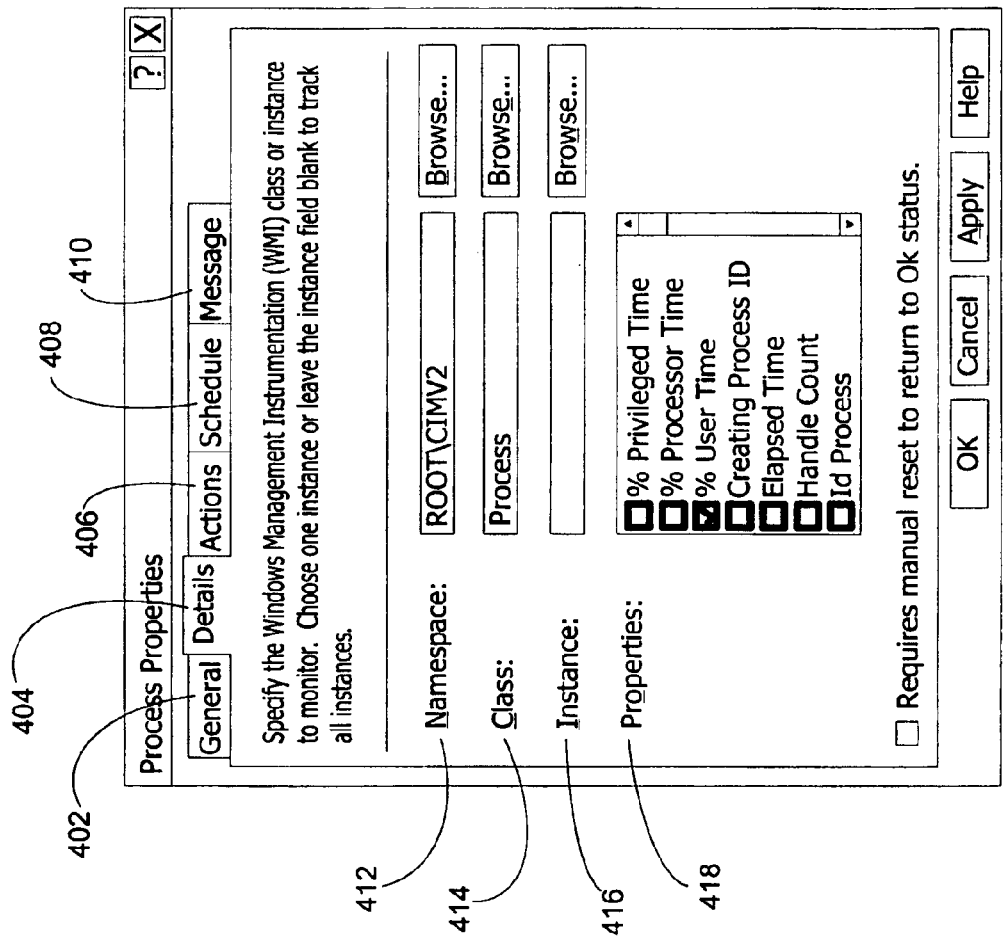
FIG. 4 is an exemplary embodiment of the method and system of the invention illustrating a user interface for collecting all objects of a specific class by inputting the class name.

Referring next to FIG. 4, an exemplary embodiment of the monitoring application includes a user interface for collecting all objects of a specific class by inputting the class name. A pop-up window includes tabs labeled General 402, Details 404, Actions 406, Schedule 408, and Message 410. The Details tab 404 displays multiple input boxes for inputting a Namespace 412, a Class 414, an Instance 416, and one or more Properties 418. In FIG. 4, the Namespace input box 412 displays "root\cimv2" indicating that the root namespace has been input as the namespace to monitor. The Class input box 414 indicates that "Process" has been input as the class to monitor. The Instance input box 416 is blank, indicating that all objects of the class "Process" are to be monitored. In one embodiment, the user may specify multiple objects (e.g., processes) to monitor in the Instance input box 416. The Properties input box 418 has "% User Time" selected, indicating that the monitoring application will collect for each object of the class the attribute representing the percentage of user time. In one embodiment, the user may specify multiple attributes to monitor in the Properties input box 418 for each object specified in the Instance input box 416.

Figure 5:
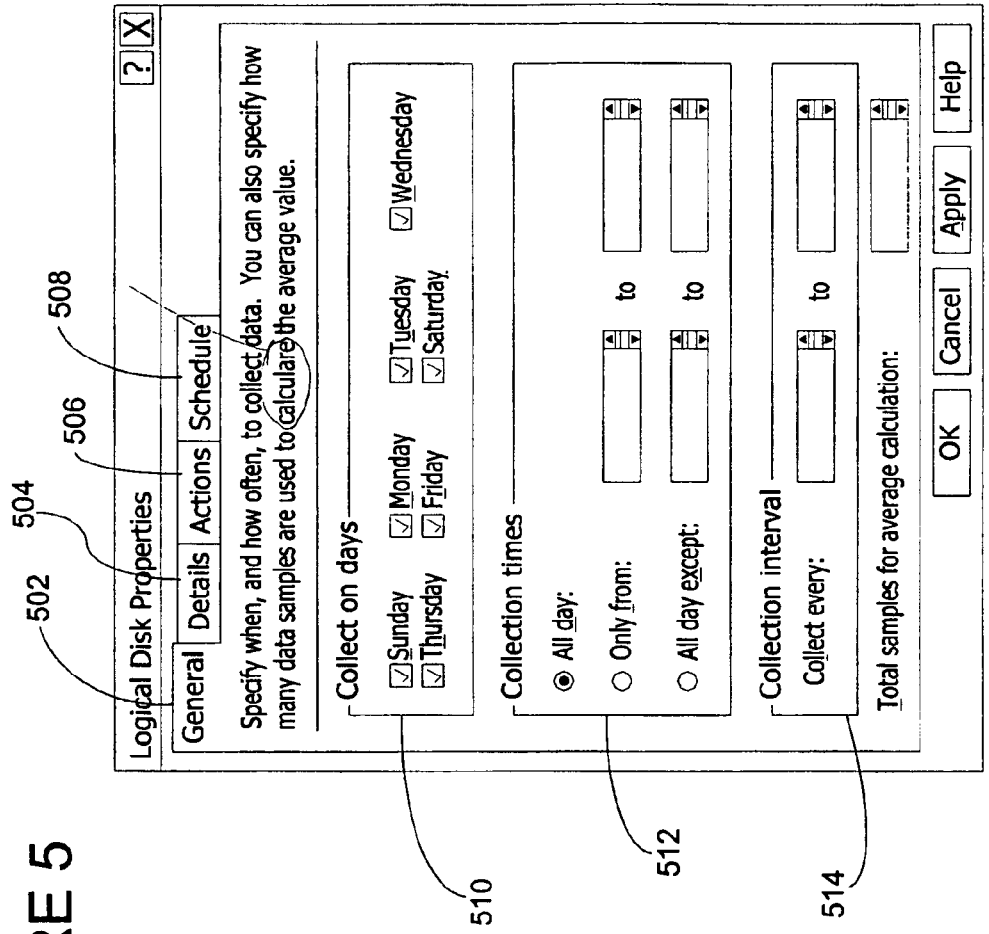
FIG. 5 is an exemplary embodiment of the method and system of the invention illustrating the scheduling of thresholds by a monitoring application.

Referring next to FIG. 5, an exemplary embodiment of the monitoring application includes the scheduling of thresholds. A pop-up window includes tabs labeled General 502, Details 504, Actions 506, and Schedule 508. The Schedule tab 508 displays multiple selection boxes for selecting one or more Collection Days 510, one or more Collection Times 512, and a Collection Interval 514. In FIG. 5, the Collection Days selection box 510 indicates that objects are to be collected Sunday, Monday, Tuesday, Wednesday, Thursday, Friday, and Saturday. The Collection Times selection box 512 indicates that objects are to be collected all day as opposed to only during certain times or all day except for a certain time interval. The Collection Interval selection box 514 indicates that the monitoring application is to collect objects every thirty seconds and to sample each value six times to average the calculation.

Figure 6:
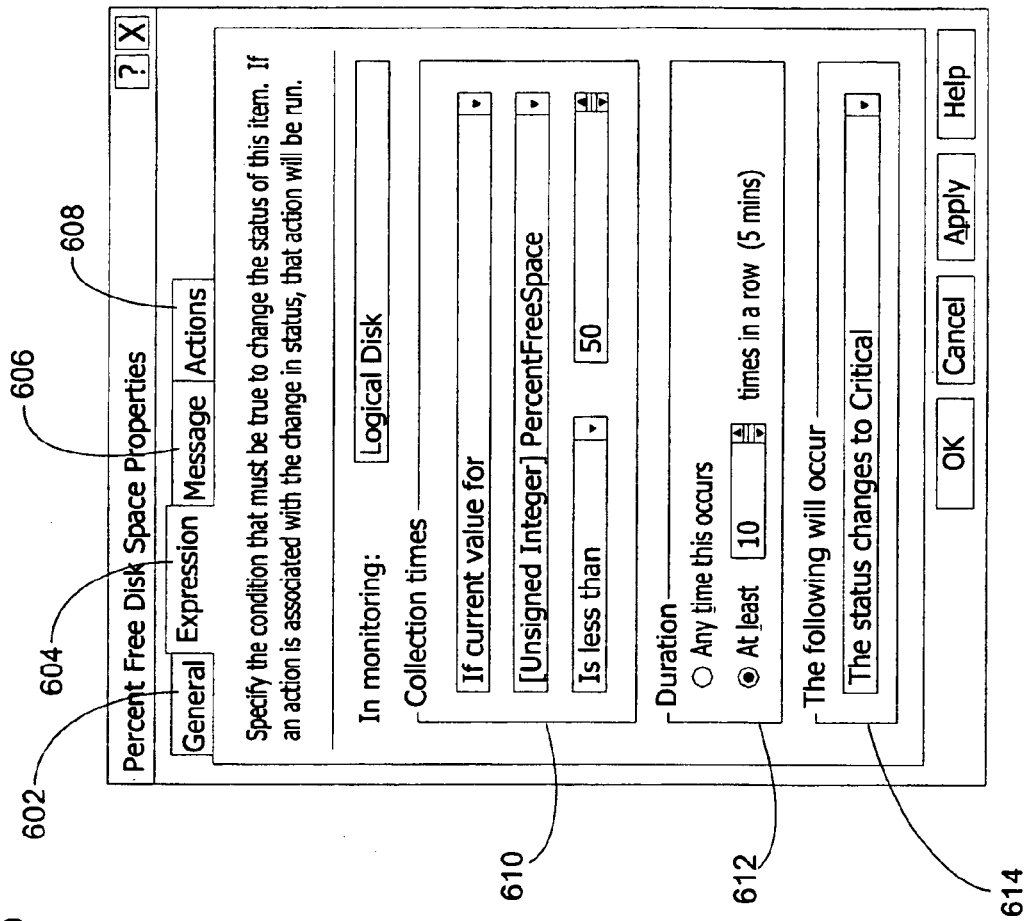
FIG. 6 is an exemplary embodiment of the method and system of the invention illustrating the definition of thresholds by a monitoring application.

Referring next to FIG. 6, an exemplary embodiment of the monitoring application includes the definition of thresholds. A pop-up window includes tabs labeled General 602, Expression 604, Message 606, and Action 608. The Expression tab 604 displays multiple selection boxes for selecting a Condition 610 of a specific attribute value, a Duration 612 of the condition, and a Resulting Action 614 to take if the condition fit 20 and duration requirements are met. In FIG. 6, the Condition selection box 610 selects a condition where the current attribute value for the PercentFreeSpace attribute is less than fifty. The Duration selection box 612 indicates that the condition must persist at least ten times in a row (or five minutes) as opposed to just on occurrence of the condition. The Resulting Action selection box 614 indicates that the status changes to critical if the condition is met for the specified duration.

The Condition selection box 610 of FIG. 6 has four pull-down menus. In one pull-down menu, the available selections include "If the current value for," "If the average value for," and "If the change from last sample to the current." In another pull-down menu, the user selects the attributes or properties to measure. In another pull-down menu, the available conditions include "Contains the text," "Does not contain the text," "Starts with," "Ends with," "Is (Exactly)," "Is Not," and "Is always true" for string values. For numeric and date values, the available conditions include "Is less than," "Is greater than," "Is greater than or equal to," "Is less than or equal to," "Is equal to," "Is not equal to," "Is (Exactly)," "Is Not," and "Is always true." In another pull-down menu, the user enters the value to be compared with the attribute being measured.

Figure 7:
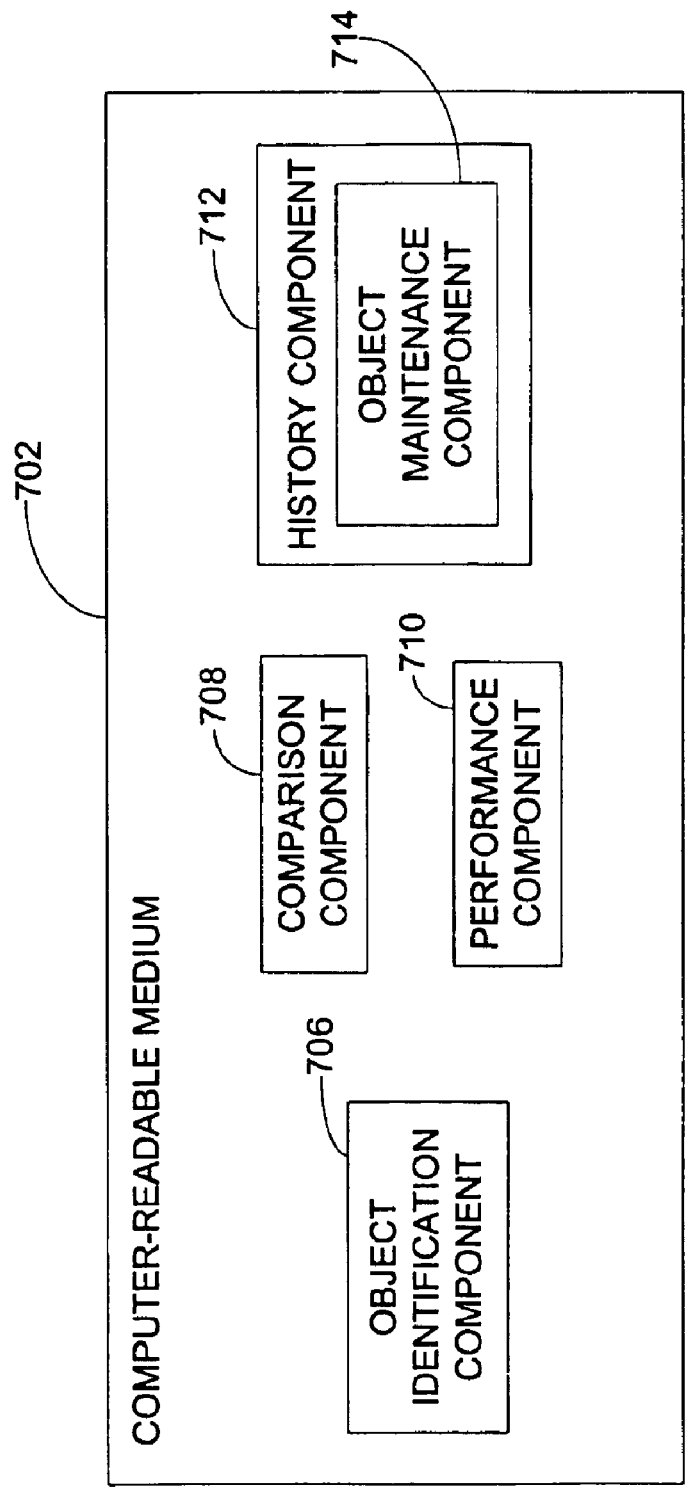
FIG. 7 is a block diagram of one embodiment of the method and system of the invention illustrating an exemplary computer-readable medium on which the invention may be stored.

Referring next to FIG. 7, a block diagram illustrates an exemplary computer-readable medium on which the invention may be stored. The computer-readable medium 702 has computer-executable instructions for performing the method of the invention. The computer-readable medium 702 includes an object-identification component 706 for dynamically identifying the objects of the specified class, a comparison component 708 to for comparing at least one of the attribute values of each identified object with a threshold value corresponding thereto, a history component 712 for identifying changes in the attribute values of each identified object over time, and a performance component 710 responsive to the comparison component 708 and the history component 712 for performing one or more functions. The history component 712 includes an object maintenance component 714 for maintaining a list of the identified objects and the attribute values of the identified objects. The object identification component 706 includes computer-executable instructions for identifying all the objects of the specified class. The object identification component 706 includes computer-executable instructions for limiting the amount of objects identified.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

When introducing elements of the present invention or the preferred embodiment(s) thereof, the articles "a" "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A computer-implement method for monitoring one or more objects of a specified class, said class having one or more attributes, each said object having an attribute value associated with each attribute, said method comprising:

dynamically identifying the objects of the specified class, said class representing a mass storage device;

comparing at least one of the attribute values of each identified object with a threshold value associated with at least one of the attributes in the class, said attributes including a free space attribute, a capacity attribute, and a description attribute;

maintaining a list of the identified objects and the attribute values of the identified objects over time;

identifying changes in the maintained attribute values of each of the identified object over time; and performing one or more functions in response to comparing and identifying changes including notifying a user of a free space attribute and a description attribute of a specific object if the free space attribute value of the specific object exceeds value associated with the free space attribute of the specific object.

2. The computer-implemented method of claim 1, wherein performing includes generating a notification if an attribute value of a specific object exceeds the threshold value.

3. A computer-implemented method for monitoring one or more objects of a specified class, and class having one or more attributes, each said object having an attribute value associated with each attribute, said method comprising:

dynamically identifying the objects of the specified class;

comparing at least one of the attribute values of each identified object with a threshold value associated with at least one of the attributes in a specified class;

maintaining a list of the identified objects and the attribute values of the identified objects over time;

identifying changes in the maintained attribute values of each identified object over time;

performing one or more functions in response to comparing and identifying changes including generating a notification if an attribute value of a specific object exceeds the threshold value in response to comparing and identifying changes; and suppressing the notification if the attribute value of the specific object exceeded the threshold value in a previous interval.

4. The computer-implemented method of claim 1, wherein performing includes averaging attribute values over one or more intervals as an indication of performance.

5. The computer-implemented method of claim 1, wherein performing includes displaying the attribute values to the user.

6. The computer-implemented method of claim 1, wherein the user specifies the threshold value for each of the attributes in the class.

7. The computer-implemented method of claim 1, wherein maintaining includes adding at least one of the identified objects to the list, deleting at least one of the identified objects from the list, and/or preserving the list.

8. The computer-implemented method of claim 1, wherein dynamically identifying the objects includes limiting the amount of objects identified.

9. The computer-implemented of method claim 1, where dynamically identifying the objects occurs in response to a user request.

10. The computer-implemented method of claim 1, wherein the objects are stored in a database, wherein identifying occurs in response to an update to the database.

11. The computer-implemented method of claim 1, wherein the threshold value is associated with a plurality of the attributes of the class.

12. The computer-implemented method of claim 3, wherein the specified class represents a mass storage device and the attributes include a free space attribute, a capacity attribute, and a description attribute.

13. The computer-implemented method of claim 3 wherein performing includes displaying the attribute values to a user.

14. The computer-implemented method of claim 3 wherein performing includes displaying the attribute values to a user.

15. The computer-implemented method of claim 3 wherein the user specifies the threshold value for each of the attributes in the class.

16. The computer-implemented method of claim 3 wherein maintaining includes adding at least one of the identified objects to the list, deleting at least one of the identified objects from the list, and/or preserving the list.

17. The computer-implemented method of claim 3 wherein dynamically identifying the objects includes limiting the amount of objects identified.

18. The computer-implemented method of claim 3 wherein dynamically identifying the objects occurs in response to users request.

19. The computer-implemented method of claim 3 wherein the objects are stored in a database, wherein identifying occurs in response to an update to the database.

20. The computer-implemented method of claim 3 wherein the threshold value is associated with a plurality of the attributes of the class.

* * * * *